US008584814B2

(12) United States Patent
Chaumontet et al.

(10) Patent No.: US 8,584,814 B2
(45) Date of Patent: Nov. 19, 2013

(54) SELF-ARRESTING ROPE BELAY DEVICE

(75) Inventors: Michael Chaumontet, Bresson (FR); Christophe Quillard, Grenoble (FR); Alain Maurice, Saint Hilaire du Touvet (FR); Paul Petzl, Barraux (FR)

(73) Assignee: Zedel, Crolles (FR)

( * ) Notice: Subject to any disclaimer, the term of this patent is extended or adjusted under 35 U.S.C. 154(b) by 428 days.

(21) Appl. No.: 12/885,997

(22) Filed: Sep. 20, 2010

(65) Prior Publication Data

US 2011/0073417 A1 Mar. 31, 2011

(30) Foreign Application Priority Data

Sep. 25, 2009 (FR) ..................................... 09 04593

(51) Int. Cl.
*B65H 59/16* (2006.01)
*F16D 55/08* (2006.01)

(52) U.S. Cl.
USPC ......................................... 188/65.1; 188/65.4

(58) Field of Classification Search
USPC ............ 188/65.1, 65.2, 65.4, 65.5; 182/5, 70, 182/71, 72
See application file for complete search history.

(56) References Cited

U.S. PATENT DOCUMENTS

| | | | | |
|---|---|---|---|---|
| 5,076,400 | A | 12/1991 | Petzl et al. | |
| 5,577,576 | A * | 11/1996 | Petzl et al. | 188/65.4 |
| 6,843,346 | B2 * | 1/2005 | LeBeau et al. | 182/5 |
| 6,899,203 | B1 * | 5/2005 | Golden et al. | 188/65.4 |
| 7,845,467 | B2 * | 12/2010 | Petzl et al. | 182/5 |

FOREIGN PATENT DOCUMENTS

| | | | |
|---|---|---|---|
| EP | 0 398 819 | A1 | 11/1990 |
| FR | 2 626 184 | A1 | 7/1989 |
| FR | 2 721 523 | A1 | 12/1995 |

* cited by examiner

*Primary Examiner* — Melody Burch
(74) *Attorney, Agent, or Firm* — Oliff & Berridge, PLC

(57) ABSTRACT

The invention relates to a self-arresting rope belay device comprising a cam arranged to clamp the rope when the rope is under tension, and a lever arranged to act on the cam to progressively release the rope by manual action on the lever. The lever acts on the cam respectively with a geared-down effect in an initial part of its release travel, and with a direct effect in a final part of its travel. This results in the relative movement of the cam with respect to the lever being smaller in the initial part of the travel than in the final part, which enables accurate adjustment of the braking effort and of the running speed of the rope in the initial part of travel of the lever.

7 Claims, 5 Drawing Sheets

SELF-ARRESTING ROPE BELAY DEVICE

BACKGROUND OF THE INVENTION

The invention relates to a self-arresting belay device for a rope, able to act as descender or to belay a climber. Such a device is designed to clamp the rope automatically as soon as the rope is under tension. If the user wants to let the rope run free, he has to perform manual operation on a lever.

STATE OF THE ART

FIG. 1 partially represents a conventional self-arresting device in situation, as described in European Patent EP0398819. The device comprises a pair of pulleys 12, 14 housed between two parallel flange-plates, one 18 of which, hereafter called base flange-plate, is represented. The first pulley 12 is fixedly mounted on base flange-plate 18 by means of a securing element 22. Pulley 12 is equipped with a circular top sector having a guide groove for guiding rope 26, and with a braking surface 28 situated facing the second pulley 14. Braking surface 28 is substantially flat.

Second pulley 14 is secured to a support plate 30 mounted pivotally around a pivot pin 32 of flange-plate 18.

Pulley 14 is shaped as a cam that is eccentric with respect to pivot pin 32. This cam 14 comprises a circular bottom sector having a groove 34 for receiving rope 26, this groove 34 being centred on an imaginary axis slightly offset with respect to pin 32. Opposite groove 34, there is located a wedge 36 designed to jam rope 26 against braking surface 28 when support plate 30 rotates clockwise due to the effect of the tension of the rope and of the friction force of the rope on cam 14.

A second braking surface 38 and a guiding surface 40 of rope 26 extend between wedge 36 and circular groove 34 of cam 14. Surface 38 is substantially flat and is located farther away from pin 32 than surface 40.

The position of pin 32 of cam 14 is such that wedge 36 never comes into engagement against braking surface 28 of pulley 12.

In an extreme, arresting position, when the tension of rope 26 exceeds a set threshold of the apparatus, plate 30 pivots until first and second surfaces 28, 38 are facing one another, parallel to one another, and clamp rope 26. This position occurs when the user falls.

A whole range of braking positions exists between this arresting position and the free position represented in FIG. 1, the braking effect being all the greater as plate 30 pivots in the clockwise direction and wedge 36 clamps the rope.

The bottom part of base flange-plate 18 is provided with an opening 48 in which an attachment carabiner (not represented) can be inserted.

An operating lever 58 is associated with support plate 30 to make cam 14 pivot, by manual action, around pin 32 from an arresting position to a releasing position. Operating lever 58 is articulated on plate 30 by a pivot pin 60 situated opposite pivot pin 32 with respect to groove 34, and operates in conjunction with a return spring 62 which biases lever 58 to a rest position in alignment with pivot pins 32 and 60. The working position of lever 58 is illustrated by a mixed line in FIG. 1 and is obtained by lowering lever 58 counterclockwise, against the return force of spring 62.

In operation, the device is attached to a user by a carabiner passing through opening 48, and the rope exiting the device via cam 14 is under tension, for example under the weight of the user when the device is used as a descender. This tension makes plate 30 and cam 14 pivot clockwise and causes progressive jamming of the rope between wedge 36 and surface 28 without any other action from the user. If the user wants to continue his progression, he has to release the rope manually by pulling on operating lever 58 counterclockwise.

With this type of device, the useful range of braking positions is located within a small travel of lever 58, whereby the user has difficulties in finding a suitable braking position enabling him to progress continuously at the desired speed. Furthermore, the effort required to make cam 14 move from the arresting position to a position where the rope can start to run is considerably greater than the effort required to modulate the braking effect on a free running rope. This results in the user progressing by jerks, always seeking the right position between the arresting position and the released position.

SUMMARY OF THE INVENTION

There is therefore a need for a rope belay device allowing the user to easily find a braking position enabling progression at a continuous desired speed.

To satisfy this need, a self-arresting rope belay device is provided comprising a cam arranged to clamp the rope when the rope is under tension, and a lever arranged to act on the cam to progressively release the rope by manual action on the lever. The lever acts on the cam respectively with a geared-down effect in an initial part of its releasing travel and with a direct effect in a final part of its travel.

This results in the relative movement of the cam with respect to the lever being smaller in the initial part of the travel than in the final part of the travel, enabling accurate adjustment of the braking effort and of the rope running speed in the initial part of travel of the lever.

BRIEF DESCRIPTION OF THE DRAWINGS

Other advantages and features will become more clearly apparent from the following description of exemplary non-restrictive embodiments of the invention, illustrated by the accompanying drawings, in which.

DESCRIPTION OF A PREFERRED EMBODIMENT OF THE INVENTION

Figure 1:
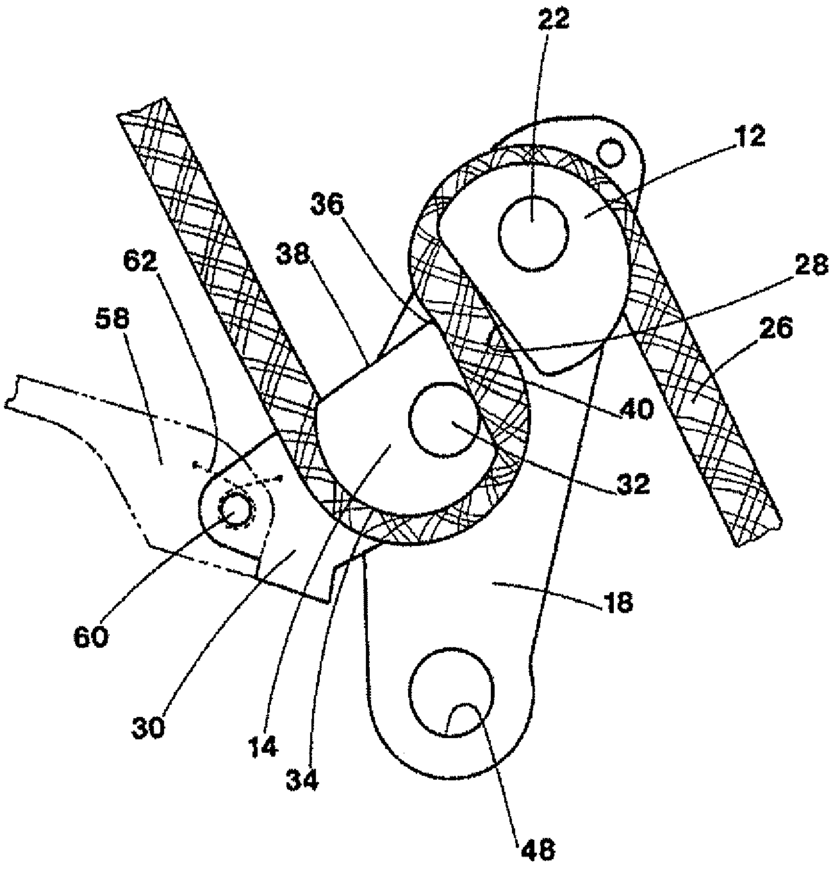
Fig 1 (prior art)
FIG. 1, previously described, represents a conventional self-arresting rope belay device.
Figure 2:
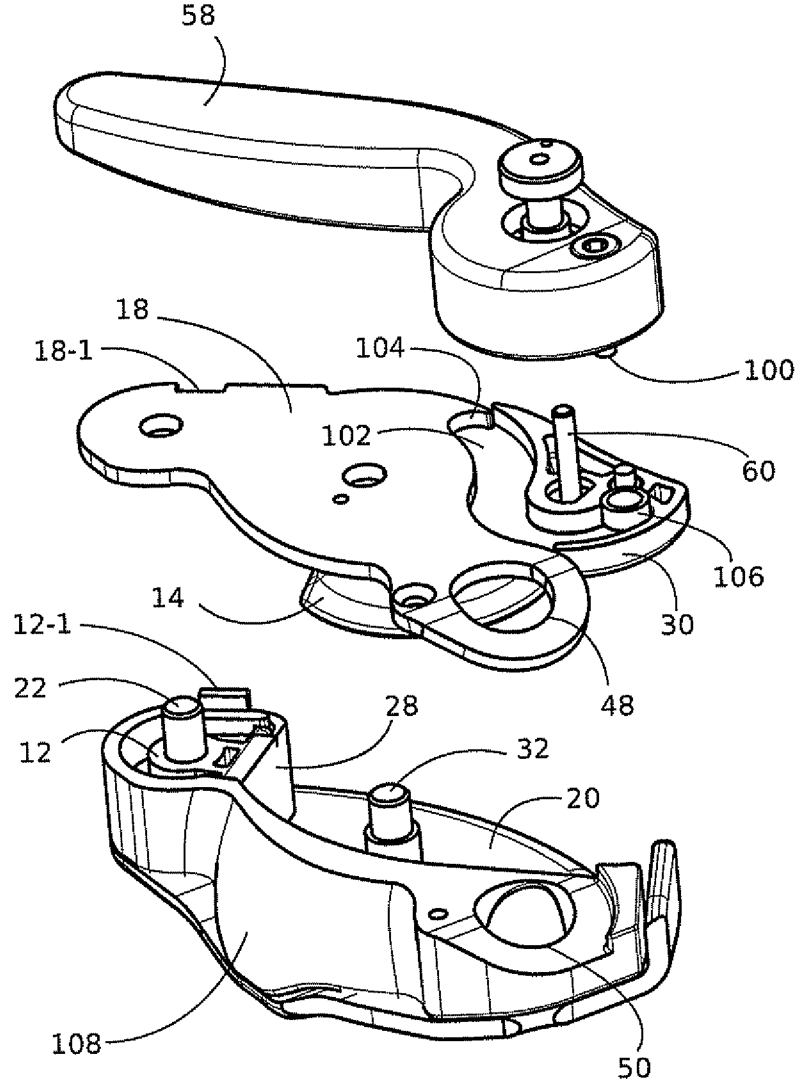
FIG. 2 represents an exploded perspective view of an embodiment of an improved belay device.

FIG. 2 represents an exploded perspective view of an embodiment of a belay device offering an accurate control of the running speed of the rope. Elements having similar functions as those of the conventional device of FIG. 1 are shown, and they are designated by the same reference numbers, even if they sometimes have different shapes.

Flange-plate 18 acting as a reference part for assembling the other component parts is shown. Cam 14 and plate 30 form a single part articulated around pivot pin 32. This single part will hereafter be designated by 'cam 14'.

Lever 58, articulated on cam 14 by means of pivot pin 60, is represented in the rest position, folded back to follow the overall profile of the device.

To enable accurate control of the running speed of the rope, the base of lever 58, on the side opposite a part forming a handle, is provided with a stud 100 parallel to pivot pin 60. In the represented rest position of the lever, stud 100 is situated on the opposite side from pivot pin 32 with respect to pivot pin 60. This stud 100 extends downwards and beyond the top plane of flange-plate 18. Flange-plate 18 is carved out at 102 to enable stud 100 to move freely over the majority of the travel of lever 58 between its rest position and its folded-out active position.

Flange-plate 18 presents a stop 104 terminating recess 102 against which stud 100 presses when lever 58 is folded-out towards its active position, as will be described in greater detail with the help of FIG. 4*a*.

In order to limit caulking of flange-plate 18 by stud 100 at the level of recess 102, this stud is surrounded by a ring 106 of larger internal diameter than the diameter of the stud. This ring is floating and, to keep it in place, it is guided in a groove formed by the wall of recess 102 and the upwardly-extending walls of cam 14.

Figure 3:
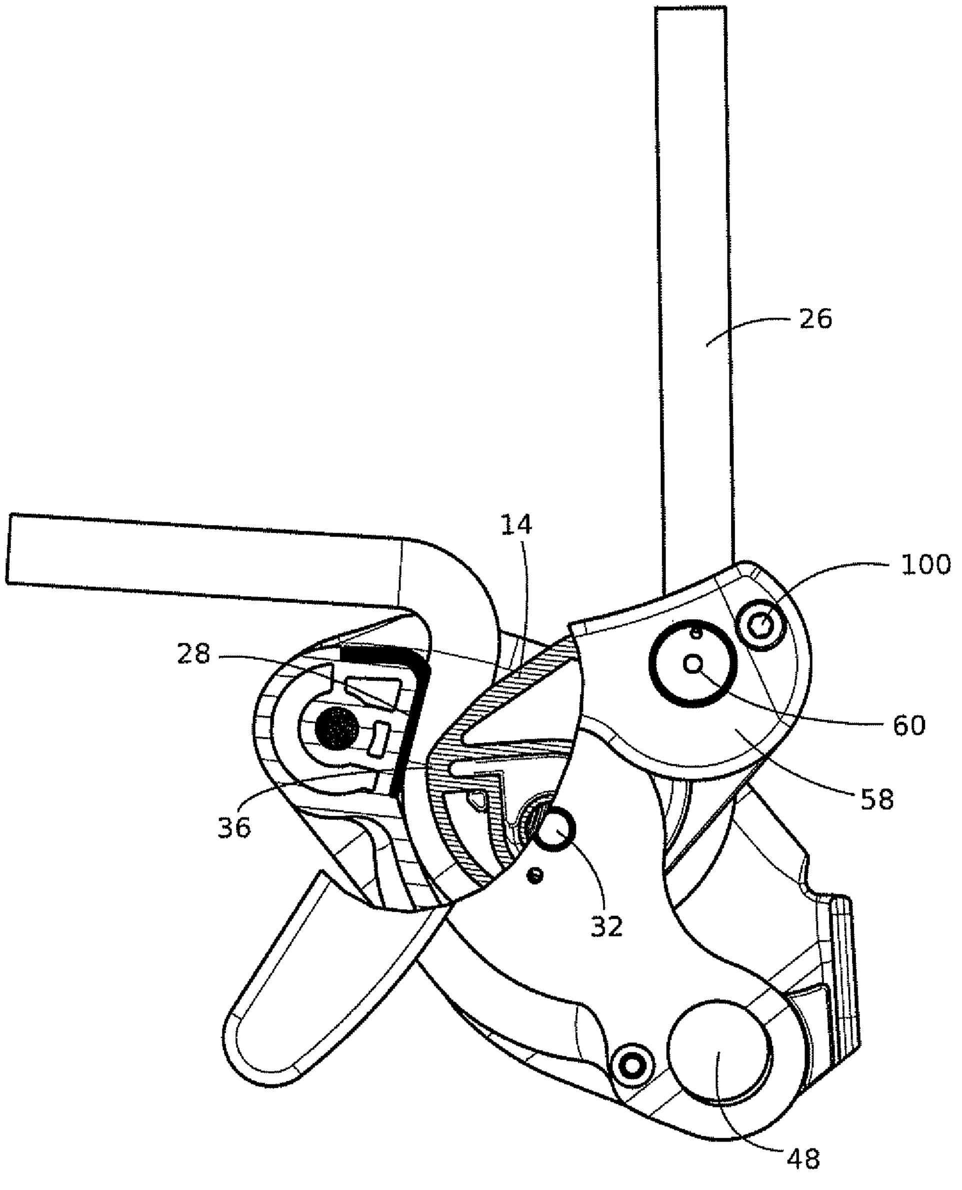
FIG. 3 represents a front view of the device of FIG. 2, in an arrested position on the rope.

Operation of the device will be better understood with the help of FIG. 3 and the following.

To complete the description of FIG. 2, fixed pulley 12 of FIG. 1 is replaced by a part 12 held by pivot pin 22 and presenting a braking surface 28. Part 12 is rotationally stopped by a tab 12-1 engaged in a notch 18-1 of flange-plate 18.

Pivot pins 22 and 32 are represented separated from flange-plate 18 for reasons of visibility. In a normal configuration, these pivot pins 22 and 32 are secured to flange-plate 18.

A second flange-plate 20 serves the purpose of closing the device and keeping the rope in place. It is articulated on flange-plate 18 by pivot pin 22 to allow the rope to be inserted and removed. It is held in the closed position by a carabiner (not shown) inserted through opening 48 of flange-plate 18 and a conjugate hole 50 of flange-plate 20.

A molded resin form 108 fills the unused empty space between flange-plates 18 and 20 and ensures protection of the mechanism.

FIG. 3 represents a front view of the device of FIG. 2 with a rope 26 installed, in its arrested position. A portion of lever 58 and of flange-plate 18 is not represented in order to show how cam 14 acts on rope 26.

Cam 14 has substantially the shape of the cam of FIG. 1. It comprises in particular a wedge shaped portion 36 for jamming the rope against braking surface 28.

Rope 26 enters the device from the right, passes underneath cam 14, and exits at the left between wedge 36 and braking surface 28. The device is hooked onto a user by means of a carabiner (not shown) passing through opening 48. The right-hand part of the rope is under tension either due to the weight of the user when the device is used as a descender or by the traction exerted by a person to be belayed when climbing. This tension biases cam 14 in counterclockwise rotation around pivot pin 32 resulting in wedge 36 clamping the rope against braking surface 28 all the more firmly as the tension increases.

To leave this arresting position, the user needs to rotate cam 14 clockwise around pivot pin 32 to move wedge 36 away from braking surface 28. To do so, the user pulls on lever 58 after unfolding it clockwise around pivot pin 60.

Figure 4A:
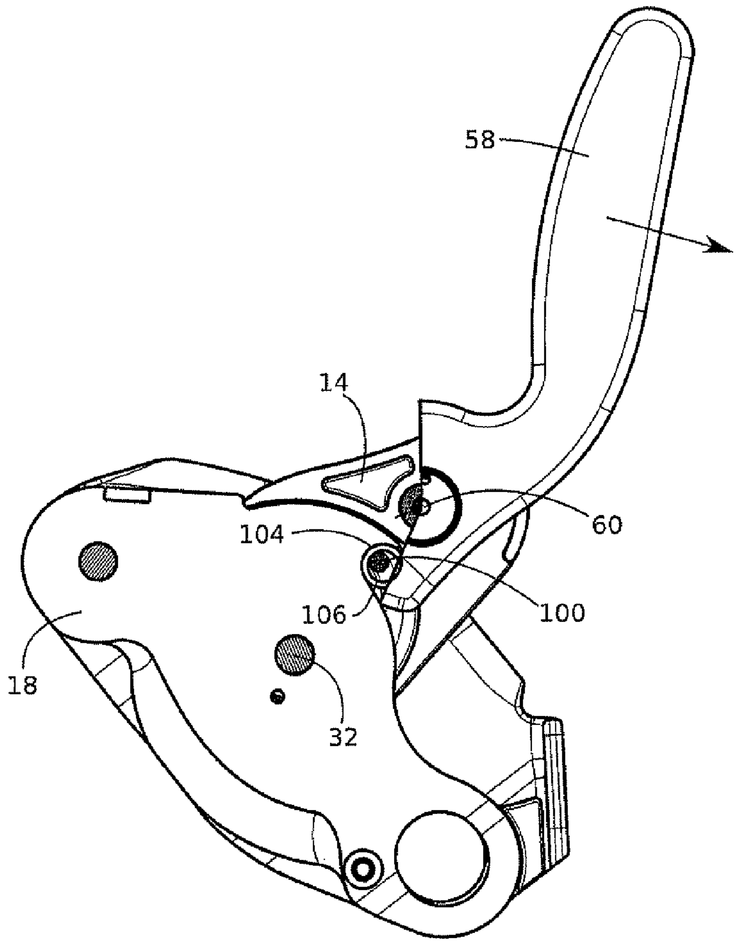
FIGS. 4*a* and 4*b* represent front views of the device of FIG. 2 respectively in a rope speed control position and in a released position.

FIG. 4*a* represents the device of FIG. 3 with lever 58 unfolded in a position where biasing of cam 14 can begin in order to perform releasing. A part of lever 58 is not represented so as to show the position of stud 100. Ring 106 surrounding the stud can also be seen.

As shown, stud 100 presses on stop 104 of flange-plate 18 between pivot pins 32 and 60 of the cam and lever. From this position, if the user pulls on the lever clockwise, cam 14 is biased clockwise with a geared-down effort compared with a conventional arrangement of the lever. The gear-down factor is equal to the ratio of the distance between stud 100 and the center of the part forming the handle of the lever over the distance between stud 100 and pivot pin 60.

Furthermore, the rotational movement of cam 14 with respect to the rotational movement of lever 58 is inversely proportional to this factor.

These effects result in the user having to use very little energy to exert a large force on the cam to overcome the force required to release the rope, and to then adjust the position of cam 14 accurately to modulate the clamping of the rope and thereby to accurately adjust the running speed of the rope.

By suitably choosing the distance between stud 100 and pivot pin 60 and the position of stop 104, it can be ensured that a gearing-down effect is obtained over the whole useful adjustment range, i.e. so long as stud 100 remains in contact with stop 104.

When the user has finished using the device, on a slack rope, he wants to be able to remove the rope quickly, i.e. move cam 14 up against a stop opposite braking surface 28.

Figure 4B:
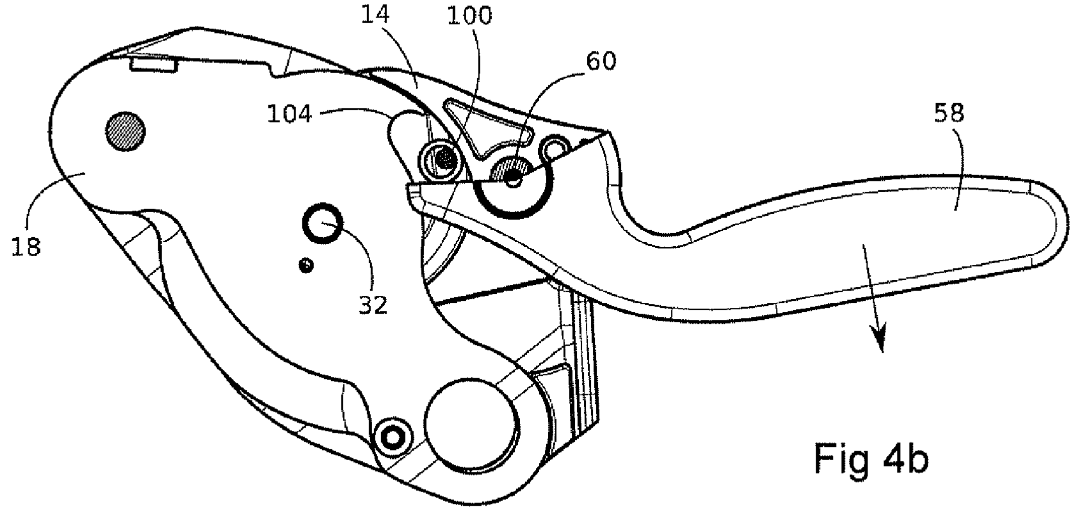

FIG. 4*b* represents the device of FIG. 3 in a released position obtained when the user continues pulling on the lever clockwise from the position of FIG. 4*a*. At a given moment, between the positions of FIGS. 4*a* and 4*b*, stud 100 disengages from stop 104 and presses against a wall of cam 14, as shown in FIG. 4*b*. Lever 58 is then fully unfolded with respect to cam 14, in an arrangement corresponding to a conventional lever configuration without gearing-down. Cam 14 then moves fast.

Figure 5:
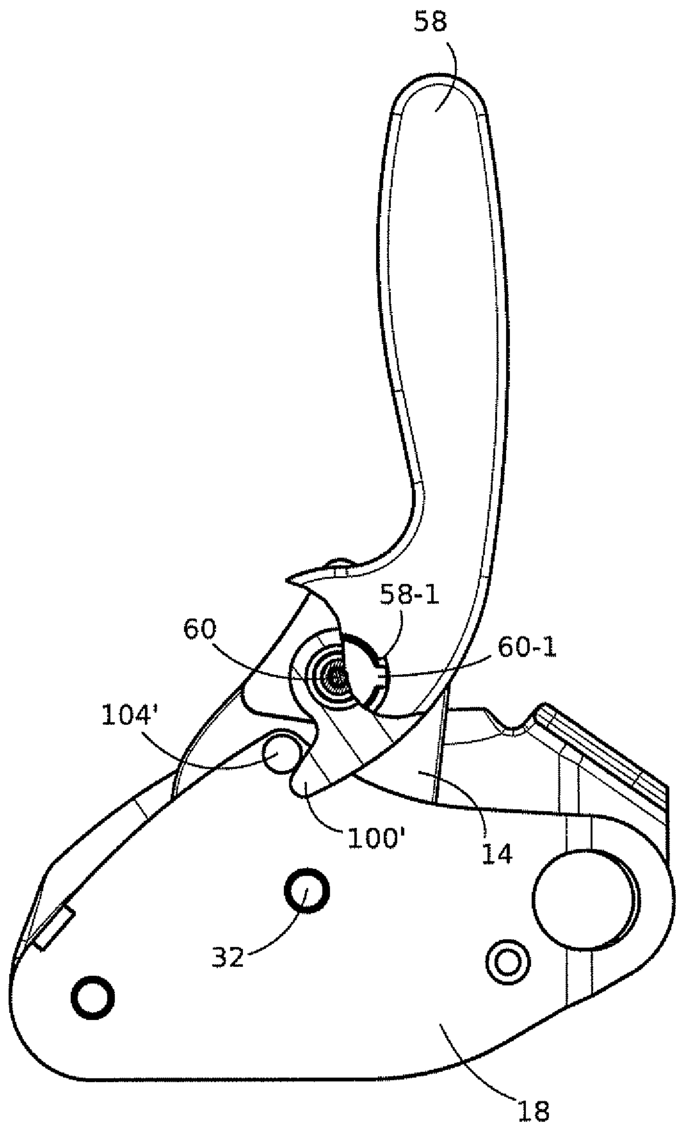
FIG. 5 represents another embodiment of the belay device.

FIG. 5 represents another embodiment of the belay device, in particular of the elements cooperating between lever 58 and flange-plate 18 to achieve gearing-down at the beginning of the release travel of cam 14.

In comparison with FIGS. 2 to 4*b*, flange-plate 18 no longer comprises a groove 102 terminated by a stop surface 104. Instead of this, flange-plate comprises a pin 104' perpendicular to the plane of the flange-plate, located at substantially the same location as stop wall 104 of the previous figures. Lever 58 no longer comprises stud 100. Instead of this, it comprises a nose 100' at substantially the same location as stud 100 of the previous figures.

Nose 100' is arranged so as to come into contact with pin 104' between pivot pins 32 and 60 when lever 58 is unfolded to its active position represented in FIG. 5, where movement of cam 14 with gearing-down can begin.

After lever 58 has been turned clockwise over an initial travel, nose 100' disengages from pin 104'. At this moment, it is desirable for cam 14 to be driven directly by lever 58 over the remainder of its travel. This is performed by a key 60-1 of pivot pin 60 movable in an enlarged groove 58-1 of the lever. Key 60-1 and groove 58-1 are configured in such a way that the key is driven by a wall of the groove when nose 100' disengages from pin 104'.

The invention claimed is:

1. Self-arresting rope belay device comprising:

a flange-plate having a braking surface;

a cam articulated on the flange-plate configured to clamp a rope against the braking surface when the rope is under tension; and a lever articulated on the cam and being movable between a folded rest position and an active position to progressively release the rope by manual action on the lever, the lever including a stud coming into contact with a stop of the flange-plate before the lever reaches an end of rotation position on the cam when the lever is turned from its folded position to its active position, wherein displacement of the lever on the cam is performed: (i) with a geared-down effect in an initial part of its release travel, and (ii) with a direct effect in a final part of its travel; and wherein relative movement of the cam with respect to the lever is smaller in the initial part than in the final part.

2. The device according to claim 1, wherein the stud is arranged between articulation axes of the cam and of the lever.

3. The device according to claim 1, wherein the stud is located in a bearing of the lever, the bearing comprising a floating ring of a larger internal diameter than a diameter of the stud.

4. The device according to claim 3, wherein the cam and the flange-plate comprise walls bounding a groove in which the stud moves with the ring between the folded and active positions of the lever.

5. The device according to claim 1, wherein the stud of the lever is formed by an extension of the lever in the form of a nose, and the stop is formed by a pin secured to the flange-plate.

6. The device according to claim 3, wherein the end of the rotation position of the lever on the cam is defined by the bearing of the lever coming into contact with a wall of the cam.

7. The device according to claim 3, wherein the end of the rotation position of the lever on the cam is defined by a key of a pivot of the lever coming into contact with a wall of a groove of the lever.

* * * * *